US012122250B2

(12) United States Patent
Nemeth et al.

(10) Patent No.: US 12,122,250 B2
(45) Date of Patent: Oct. 22, 2024

(54) SYSTEM AND A METHOD FOR CONTROLLING AN ELECTRIC VEHICLE

(71) Applicant: KNORR-BREMSE Systeme fuer Nutzfahrzeuge GmbH, Munich (DE)

(72) Inventors: Huba Nemeth, Budapest (HU); Peter Szell, Budapest (HU); Tamas Rapp, Budapest (HU); Benedek Pour, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 730 days.

(21) Appl. No.: 17/276,737

(22) PCT Filed: Aug. 27, 2019

(86) PCT No.: PCT/EP2019/072805
§ 371 (c)(1),
(2) Date: Mar. 16, 2021

(87) PCT Pub. No.: WO2020/057910
PCT Pub. Date: Mar. 26, 2020

(65) Prior Publication Data
US 2022/0041058 A1 Feb. 10, 2022

(30) Foreign Application Priority Data
Sep. 17, 2018 (EP) .................................... 18194830

(51) Int. Cl.
*B60L 3/00* (2019.01)
*B60L 15/20* (2006.01)
(Continued)

(52) U.S. Cl.
CPC ......... *B60L 3/0092* (2013.01); *B60L 15/2009* (2013.01); *B60W 10/08* (2013.01);
(Continued)

(58) Field of Classification Search
None
See application file for complete search history.

(56) References Cited

U.S. PATENT DOCUMENTS

| 6,015,193 A | 1/2000 | Vogel et al. |
| 10,589,738 B1 * | 3/2020 | Boecker ................ B60W 30/02 |

(Continued)

FOREIGN PATENT DOCUMENTS

| CN | 103373232 A | 10/2013 |
| CN | 105452076 A | 3/2016 |

(Continued)

OTHER PUBLICATIONS

Chinese-language Office Action issued in Chinese Application No. 201980060478.4 dated Apr. 27, 2023 with English translation (10 pages).

(Continued)

*Primary Examiner* — Jonathan M Dager
(74) *Attorney, Agent, or Firm* — Crowell & Moring LLP (57) ABSTRACT

A system for controlling an electric vehicle is disclosed. The electric vehicle has a main power supply for propulsion of the vehicle and at least one brake power supply for at least one brake actuator. The system includes a propulsion control unit for controlling at least one propulsion actuator, and at least one brake control unit for controlling the at least one brake actuator. The propulsion control unit is further configured to control one or more propulsion actuators to perform a backup braking or a backup steering.

14 Claims, 5 Drawing Sheets

(51) Int. Cl.
  *B60W 10/08* (2006.01)
  *B60W 10/18* (2012.01)
  *B60W 10/20* (2006.01)
  *B60W 30/18* (2012.01)
  *B60K 17/356* (2006.01)

(52) U.S. Cl.
  CPC ............ *B60W 10/18* (2013.01); *B60W 10/20* (2013.01); *B60W 30/18172* (2013.01); *B60K 17/356* (2013.01); *B60W 2510/18* (2013.01); *B60W 2520/28* (2013.01); *B60W 2710/08* (2013.01); *B60W 2710/18* (2013.01); *B60W 2710/20* (2013.01)

(56) References Cited

U.S. PATENT DOCUMENTS

| | | | |
|---|---|---|---|
| 11,511,762 B2* | 11/2022 | Huang | B60W 60/0018 |
| 2002/0111732 A1 | 8/2002 | Jager et al. | |
| 2004/0160122 A1* | 8/2004 | Yokoyama | B60L 7/18 307/9.1 |
| 2008/0208427 A1 | 8/2008 | Matsuno et al. | |
| 2009/0082150 A1* | 3/2009 | Wu | B60K 6/365 475/5 |
| 2010/0243388 A1 | 9/2010 | Holzwarth | |
| 2010/0268408 A1 | 10/2010 | Yuki et al. | |
| 2011/0175435 A1* | 7/2011 | Wuerth | B60T 8/4872 303/2 |
| 2013/0289809 A1 | 10/2013 | Treharne et al. | |
| 2016/0009257 A1 | 1/2016 | Joyce et al. | |
| 2017/0120892 A1* | 5/2017 | Kato | B60L 7/18 |
| 2019/0100105 A1* | 4/2019 | Liu | B60L 15/20 |
| 2019/0100237 A1* | 4/2019 | Klesing | B62D 5/0493 |
| 2019/0171205 A1* | 6/2019 | Kudanowski | B60W 50/035 |
| 2019/0299786 A1* | 10/2019 | Nakagawa | B60L 3/00 |
| 2019/0381895 A1* | 12/2019 | Shindo | B60L 15/2081 |
| 2021/0188252 A1* | 6/2021 | Lu | B60W 40/12 |
| 2021/0284262 A1* | 9/2021 | Sardes | B60K 26/00 |
| 2022/0057798 A1* | 2/2022 | Costin | G05D 1/0242 |
| 2022/0194232 A1* | 6/2022 | Lu | B60L 7/18 |
| 2022/0242428 A1* | 8/2022 | Sutton | B60W 50/035 |

FOREIGN PATENT DOCUMENTS

| | | |
|---|---|---|
| CN | 108290563 A | 7/2018 |
| DE | 199 58 075 A1 | 6/2000 |
| DE | 103 32 034 A1 | 2/2005 |
| DE | 10 2006 010 713 A1 | 9/2007 |
| DE | 10 2007 021 286 A1 | 11/2008 |
| DE | 10 2015 110 968 A1 | 1/2016 |
| EP | 0 754 611 A1 | 1/1997 |
| EP | 2 837 535 A1 | 2/2015 |
| JP | 2001-63539 A | 3/2001 |
| JP | 2004-243846 A | 9/2004 |
| JP | 2010-132095 A | 6/2010 |
| JP | 2010-247782 A | 11/2010 |
| JP | 2016-73061 A | 5/2016 |
| JP | 2018-90110 A | 6/2018 |

OTHER PUBLICATIONS

International Search Report (PCT/ISA/210) issued in PCT Application No. PCT/EP2019/072805 dated Oct. 28, 2019 (four (4) pages).
Written Opinion (PCT/ISA/237) issued in PCT Application No. PCT/EP2019/072805 dated Oct. 28, 2019 (five (5) pages).
Extended European Search Report issued in European Application No. 18194830.8 dated Feb. 26, 2019 (seven (7) pages).
Japanese-language Office Action issued in Japanese Application No. 2021-514527 dated Apr. 20, 2022 with English translation (15 pages).

* cited by examiner

SYSTEM AND A METHOD FOR CONTROLLING AN ELECTRIC VEHICLE

BACKGROUND AND SUMMARY OF THE INVENTION

The present invention relates to a system and a method for controlling an electric vehicle, and in particular, to a redundant architecture for electric vehicles.

The actuation of safety relevant systems such as brake systems based on compressed air as energy source is widespread today. The compressed air is stored in in reservoirs and generated by compressors. The management and monitoring of such systems are performed by central control units such as EAC (electronic air control) or APU (air processing unit).

Propulsion actuators (drive actuators like e-motors) of electric vehicles or hybrid vehicles are able to generate also a certain level of brake force. They are used as auxiliary or endurance brake source only, because propulsion actuators are not able to support vehicle dynamic functions like ABS, ATC.

The increasing electrification of mobility triggers the replacement of various vehicle components and architectures. As a result, compressed air systems, too, are replaced by electric or electronic systems. Therefore, many pneumatic units are to be replaced by electrically powered systems. In addition to this, automated driving applications imply several new requirements for the vehicle systems, especially in conjunction with safety relevant units. There is thus a demand for redundant electric power supply systems for controlling and/or actuating different components.

DE 10 2006 010 713 A1 discloses a conventional electrical system for a vehicle with at least one safety relevant load which is provided with a primary and a secondary energy supply. DE 10 2007 021 286 A1 discloses another conventional system for an electromechanical braking system and an associated method with a fail-safe power supply.

However, there is still a demand for other redundant power supply systems which are usable for electric vehicles in conjunction with safety relevant applications.

Some of these problems are solved by a system, a method, and a computer program product, according to the independent claims. The dependent claims refer to specifically advantageous realizations of the subject matters of the independent claims.

Embodiments of the present invention relate to a system for controlling an electric vehicle. The electric vehicle comprises a main power supply for propulsion of the vehicle and at least one brake power supply for at least the one braking actuator. The system includes a propulsion control unit for controlling at least one propulsion (drive) actuator, and at least one brake control unit for controlling the at least one brake actuator. The propulsion control unit is further configured to control one or more propulsion actuators to perform a backup braking and/or a backup steering.

Optionally, the propulsion control unit is configured to cause to dissipate or to recuperate brake energy released during the backup braking.

Optionally, the system includes a communication line between the propulsion actuators and the at least one brake control unit. The at least one brake control unit may be configured to control the propulsion of the vehicle via the communication line.

The system may further include a control line between the propulsion control unit and the at least one brake control unit for exchanging information about a failure of one component and/or for providing a backup control.

Optionally, the propulsion control unit and/or the at least one brake control unit is/are configured to control the propulsion actuators individually on each wheel or axle-wise.

Optionally, the at least one brake power supply comprises a first brake power supply and a second brake power supply that are independent from each other. The at least one brake control unit may comprise a first brake control unit and a second brake control unit, which are connected via an interlink to exchange information between the first brake control unit and the second brake control units and/or to provide a backup control.

Optionally, the first brake control unit is configured to be powered by the first brake power supply. The second brake power supply may be configured to power the second brake control unit. The first brake power supply and the first brake control unit may be associated with a first axle. The second brake power supply together with the second brake control unit may be associated with a different axle of the vehicle.

Optionally, the at least one propulsion actuator is configured to support at least one of the following vehicle dynamic functions:
  anti-blocking system (ABS),
  automated traction control (ATC),
  drag torque control (DTC),
  electronic stability program (ESP)
  request torque and/or a torque limitation or a torque vectoring.

The propulsion control unit may be configured to enable at least one of the vehicle dynamic functions by providing a high-frequency modulation via the propulsion actuators and/or a low-frequency modulation via the brake actuators.

Optionally, the propulsion control unit and/or the at least all the brake control unit may further be configured to receive a drive actuator motor speed signal. In case the wheel speed sensor of the brake system is unavailable, the propulsion control unit and/or the at least all the brake control unit may use the motor speed signal as a backup wheel speed signal for a braking actuation and/or for a vehicle dynamic function.

Further embodiments relate to a propulsion system for an electric vehicle. The electric vehicle comprises at least one brake power supply for safety relevant consumers. The propulsion system includes:
  a main power supply for propulsion of the vehicle;
  at least one individual propulsion actuator at each vehicle wheel; and
  a system for controlling an electric vehicle according to one of the preceding claims.

Further embodiments relate to a brake system for an electric vehicle. The electric vehicle comprises a main power supply for propulsion of the vehicle. The brake system includes:
  at least one brake power supply for safety relevant consumers; and
  a system for controlling an electric vehicle according to one of the preceding claims.

Further embodiments relate to an electric vehicle, in particular to an electric commercial vehicle, with:
  a propulsion system as defined before; and/or
  a brake system as defined before.

Further embodiments relate to a method for controlling an electric vehicle. The electric vehicle comprises a main power supply for propulsion of the vehicle and at least one brake power supply for at least the one braking actuator. The method includes the steps of:

controlling at least one propulsion actuator by a propulsion control unit;

controlling the at least one brake actuator by at least one brake control unit;

upon detecting a failure in the brake control by the at least one brake control unit, controlling one or more propulsion actuators to perform a backup braking and/or a backup steering.

This method may also be implemented in software or as a computer program product and the invention shall not be limited only on one order of steps or only in so far as the desired effect is achieved. Embodiments of the present invention can, in particular, be implemented by software or a software module in any of electronic control units (ECU) of the vehicle. Therefore, embodiment relate a computer product with a non-volatile memory having a program code stored thereon for performing the method, when the program code is executed on a processor.

A particular advantage of embodiments of the present invention relates to a redundant power supply system with a control system architecture that is particularly suited for safety relevant applications of electric vehicles such as braking, steering, sensors, lights etc. A further advantage of embodiments relates to the fact that the vehicle propulsion actuators act as a backup brake system in case a failure in the service brake system has occurred.

Some examples of the systems and/or methods will be described in the following by way of examples only, and with respect to the accompanying figures.

DETAILED DESCRIPTION OF THE DRAWINGS

Figure 1:
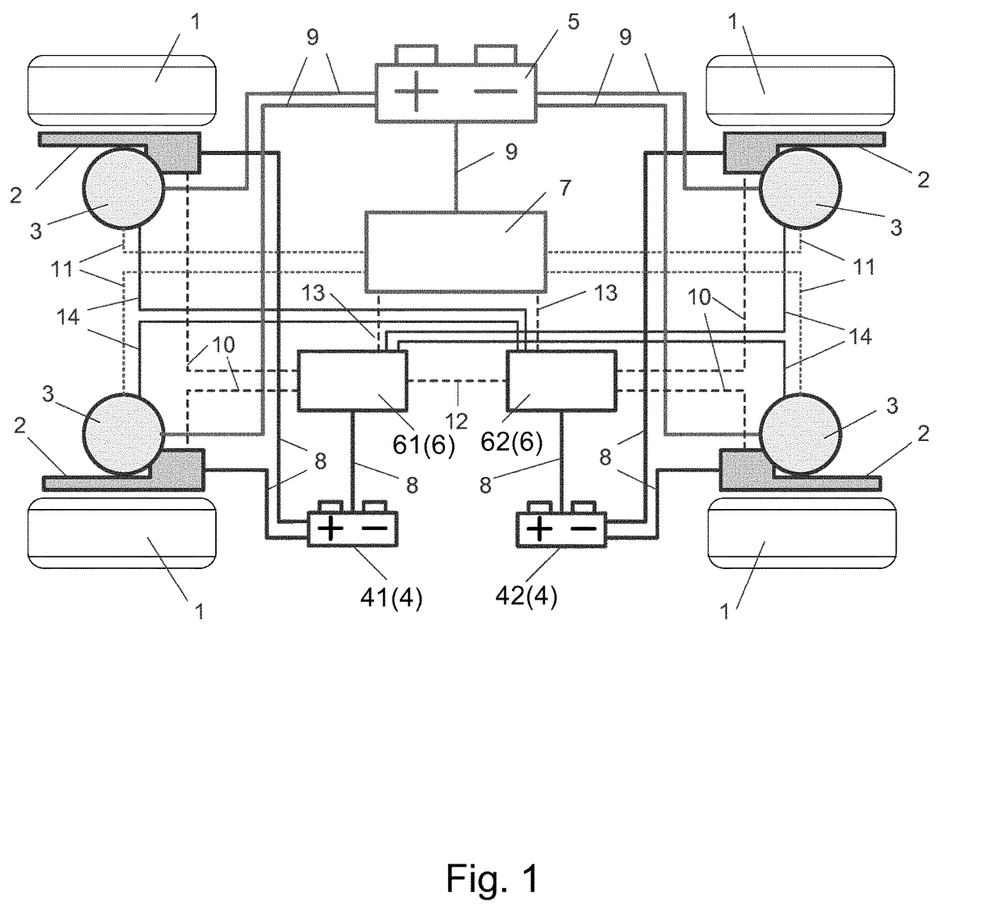
FIG. 1 depicts a system for the system for controlling an electric vehicle according to an embodiment of the present invention, with an axle-wise separated energy storages and separated control units.

FIG. 1 depicts a first embodiment for the system for controlling an electric vehicle. The electric vehicle comprises a main power supply 5, 9 for propulsion of the vehicle. The propulsion is performed using propulsion or drive actuators 3 for each wheel 1 individually or at least axle-wise. The vehicle further comprises at least one brake power supply 4, 8 dedicated as power supply for the braking system 2 which again may allow a braking of each wheel 1 individually or a combination of wheels (for example at one axle). The at least one brake power supply 4, 8 is controlled by one or more brake control units 6, 61, 62 and the main power supply 5, 9 is controlled by a propulsion control unit 7.

In the embodiment of FIG. 1, the at least one brake power supplies 4 comprises a first brake power supply 41 controlled by a first brake control unit 61 and a second brake power supply 42 controlled by a second brake control unit 62. The first and second brake control units 61, 62 are connected with an interlink 12 to enable an information/data exchange between both brake control units 61, 62. The brake control units 61, 62 are further connected via a control or communication lines 13 with the propulsion control unit 7. In addition, the brake control units 61, 62 are connected with the braking actuators 2 via lines 10, wherein the first brake control unit 61 controls, for example, front axle and the second brake control unit 62 controls, for example, the rear axle.

Similarly, the propulsion control unit 7 is connected to the propulsion actuators 3 via lines 11 that may allow an independent controlling of the propulsion actuators 3 at each wheel or at least at each axle. The propulsion actuators 3 may be e-motors able to drive at least one wheel 1 or two wheels at an axle or two axles. The wheels 1 may be braked with electrically actuated friction brakes 2. For this, each wheel 1 may be driven by an individual drive unit 3 and braked by an individual a brake unit 2. The driveline is supplied by the energy storage as part of the main power supply 5 (for example battery or supercapacitors or other storage elements), which may not only provide the energy for the propulsion of the vehicle, but may also take energy during recuperative braking. This driveline is controlled by the propulsion control unit 7.

The main power supply 5 provides supply power to the propulsion actuators 3 and to the propulsion control unit 7 via power supply lines 9. The first/second brake power supply 41, 42 provides supply power to the first/second brake control unit 61, 62 and to brake units 2 via power supply lines 8.

According to further embodiments it is possible that the propulsion motors (propulsion actuators 3) are connected to brake resistors to dissipate energy when the braking force is generated by the propulsion actuators 3 and when the propulsion battery (main power supply 5) is full, for example.

In the embodiments of FIG. 1 the brake system comprises two independent power circuits and each of them is connected with a dedicated energy storage unit (brake circuits 41, 42) with dedicated brake control units 61, 62. Since they are connected via the communication interlink 12, both brake control units 61, 62 are able to control any of the wheel brakes 2. During normal operation one of them is selected as a master unit, the other as slave. The brake control units 61, 62 may provide one or more of the following control commands/signals:

signal(s) related to brake torque for the brake actuators, command(s) to enable the vehicle dynamic function like ABS (anti blocking system), ATC (automated traction control), DTC (drag torque control), ESP (electronic stability program), request torque and/or torque limitation from the propulsion units for recuperating, for support vehicle dynamic functions (torque vectoring).

In case of failure in one of the brake supplies 41 or 42 and thus on one axle (e.g. energy source of one circuit is down), the brake control unit 62 or 61 of remaining brake circuit 42 or 41 may take over the responsibility for the brake control. The drive/propulsion actuators 3 of the failed axle may perform supportive brake actuations, which can be commanded by the remaining brake control unit 62 or 61 (via the data connections 14). In particular, the propulsion actuators 3 are able to support even vehicle dynamic function like ABS (to avoid locking of wheels) or ATC (to avoid spinning of wheels)—at least up to a certain level. For this, the propulsion control unit 7 may enable the vehicle dynamic functions by providing a high-frequency modulation for the propulsion actuators 3 and/or a low-frequency modulation for the brake actuators 2 (using communication lines 10).

Additional monitoring functions can be implemented within the propulsion/brake control units 7, 6, 61, 62 or may be provided by separate management units (not shown in FIG. 1). This monitoring includes in particular the monitoring of the stored energy level or the state of function (estimation about a number of manoeuvres that are still possible, e.g. 8 full braking actions) of the dedicated energy storage units 4, 41, 42. In addition, also the main power supply 5 can be monitored and/or managed (e.g. charged) to keep the energy level at a target level to be able to perform defined manoeuvres (e.g. so-called minimal risk manoeuvres) to reach safe state.

According to further embodiments of the present invention, the brake control units 61, 62 demands the drive actuators 3 to provide a brake torque on the wheel, for example, when a failure in the brake system is detected. Thus, the drive system and drive actuator(s) 3 act as a backup for the brake system. For this purpose, communication/control lines 13, 14 are available between the propulsion control unit 7 and brake control units 6, 61, 62 or between brake control unit 61, 62 and drive actuator(s) 3 or both. Since the drive actuators 3 may be individually controlled for each wheel or with complete axle(s), the drive actuators 3 can provide braking forces individually for each wheel. For example, the brake demand may propagate from one of the brake control units 61, 62 to the drive actuator(s) 3 either through the propulsion control unit 7 along the path via the elements/lines: 6→13→7 →11→3 or directly to the drive actuator: 6→14→3. If both communication/control lines 13, 14 are available, one of them may be selected as a primary control line, the other is then a backup line if the primary control line is not available.

Since the individual wheel drive actuators 3 may be able to generate different torque on wheels 1 on the same axle, embodiments enable even a support of the steering function of the vehicle (if the steering roll radius is positive).

According to yet another embodiment, the propulsion control unit 7 and/or the brake control unit(s) 6, 61, 62 may use a motor speed signal transmitted to the drive actuator(s) 3 as backup to achieve a brake, steering or other vehicle dynamic functions.

Figure 2:
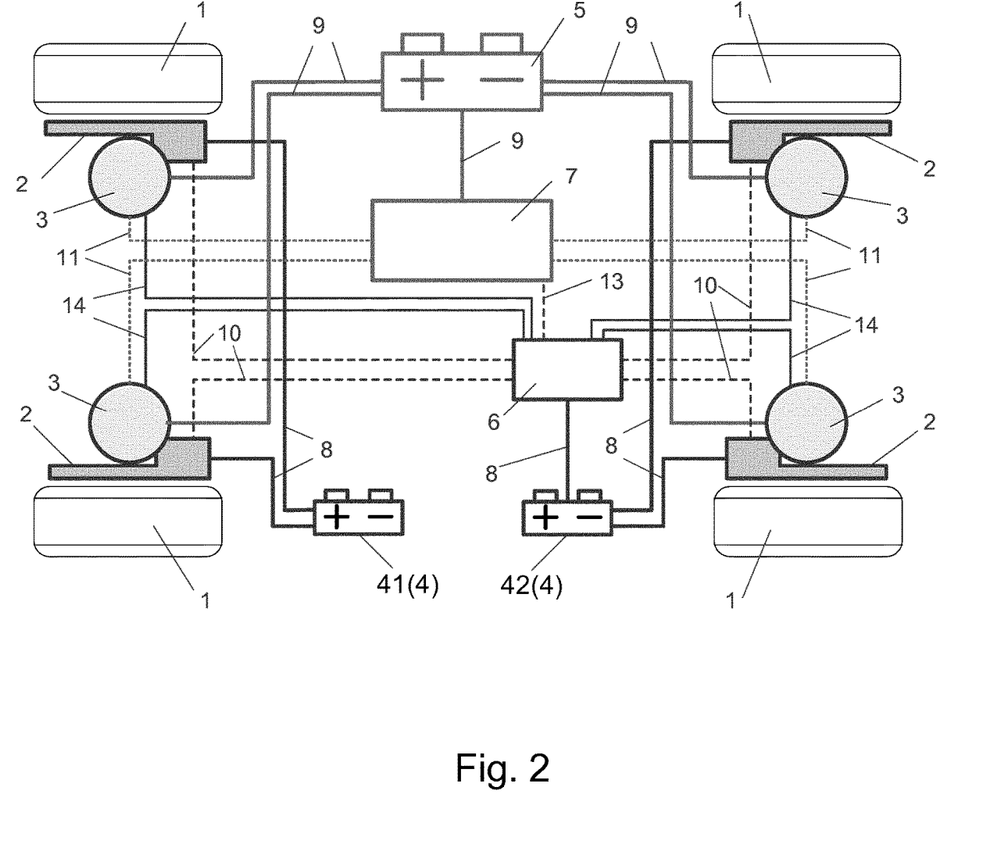
FIG. 2 depicts another embodiment for the system of controlling the electric vehicle.

FIG. 2 depicts another embodiment according to the present invention. It differs from the embodiment of FIG. 1 in that only one brake control unit 6 is provided to control the brake actions on all wheels 1 via the communication lines 10. The brake control unit 6 receives supply power from one of the brake power supplies (e.g. from the second brake power supply 42).

As in the embodiment of FIG. 1, if brake control unit 6 has a failure, the drive control unit 7 takes over the control. For this, the drive control unit 7 has access to communication lines 10 via the brake control unit 6 to the brake actuators 2 in case brake control unit 6 has a failure (e.g. is broken, but control signals may be passed through).

All other components or functions are the same as described in the embodiment of FIG. 1 so that a repeated description can be avoided here.

Figure 3:
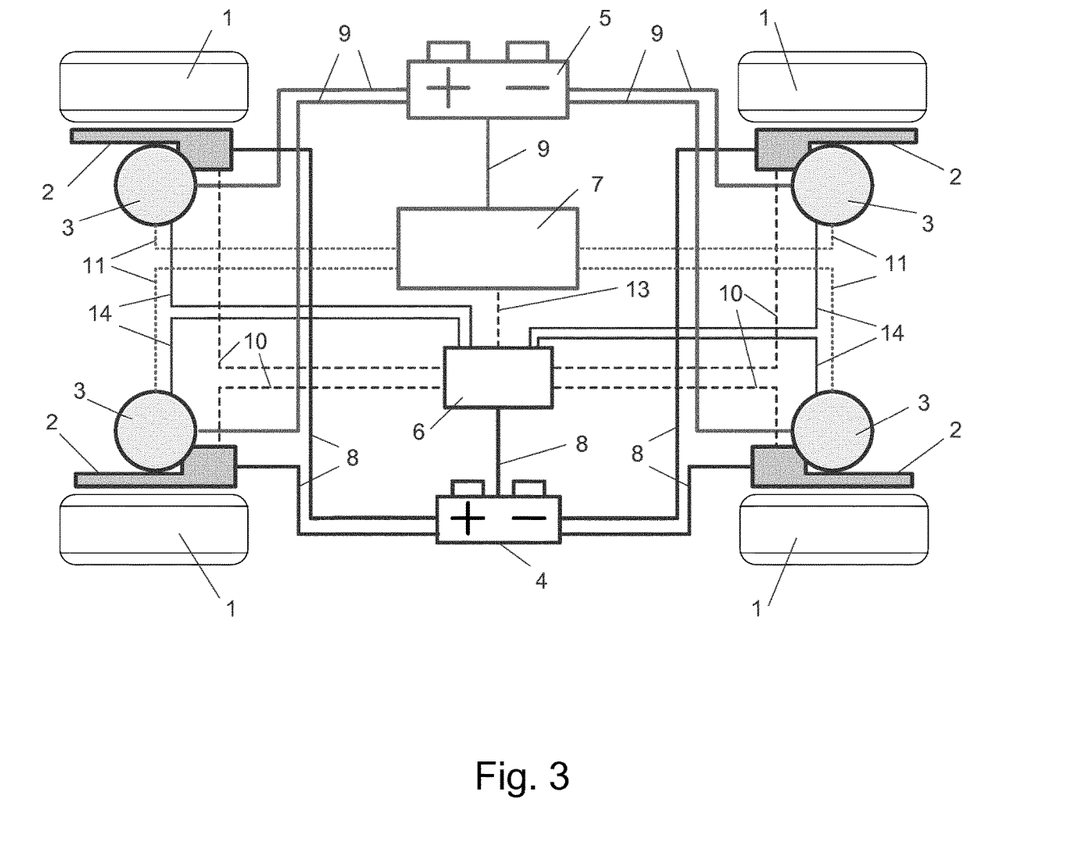
FIG. 3 depicts yet another embodiment for the system of controlling the electric vehicle.

FIG. 3 depicts yet another embodiment of the system with only a single brake power supply 4 and a single brake control unit 6. Nevertheless, the desired redundancy in the system can maintained. In this embodiment, the propulsion control unit 7 is adapted to control the brake system by performing the functions of the brake control unit 6 including controlling the brake actuators 2. This may be needed, for example, in case any of the brake power supply 4 and/or the brake control unit 6 fails.

All other components or functions are the same as described in the embodiment of FIG. 1 so that a repeated description can be avoided here.

According to further embodiments, the vehicle systems may include a steering system, which comprises at least one steering actuator and possibly an integrated steering control unit. The steering system—as the brake system—should be redundant and thus two independent power circuits should be available for the steering system.

Figure 4:
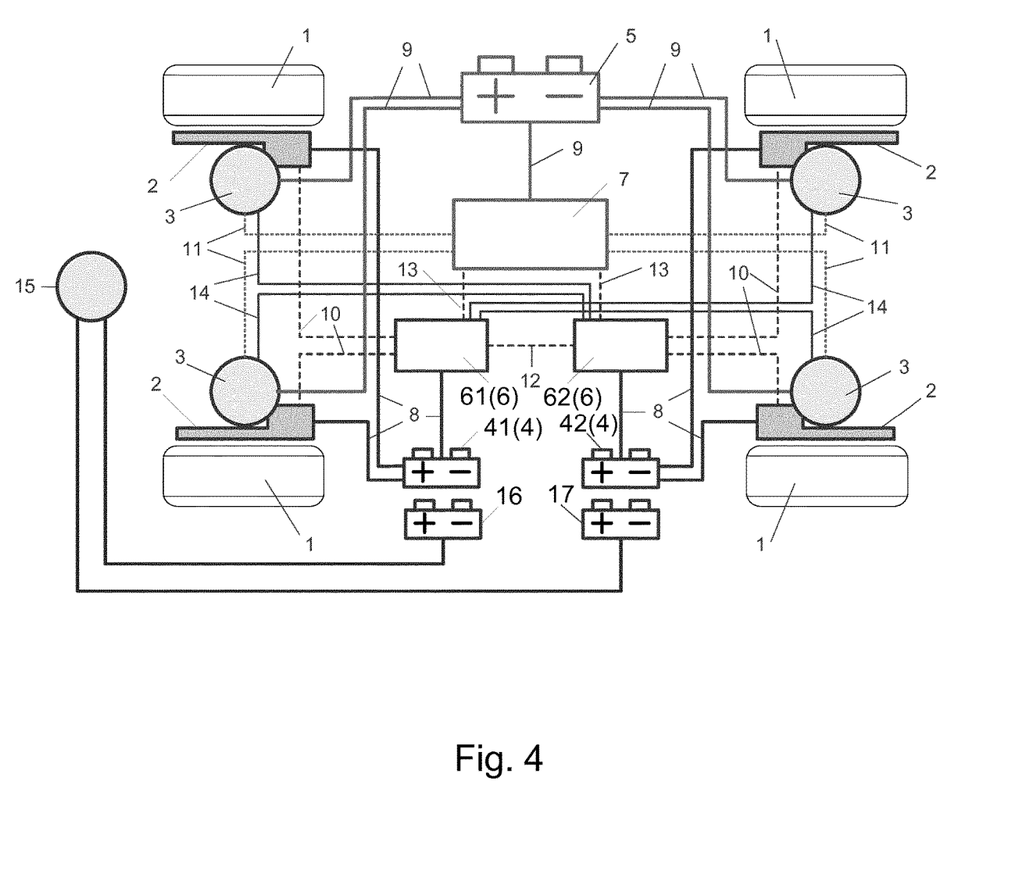
FIG. 4 depicts another embodiment for the system of controlling the electric vehicle.

FIG. 4 depicts an embodiment of the system with such a steering system 15. Again, most of the components or functions are the same as described in conjunction with FIG. 1. This embodiment differs from the embodiment of FIG. 1 by the additional redundant electric energy storage units 16, 17 supplying power for the steering system 15. Therefore, the main power supply 5 provides power to the drive actuators 3, the brake power supplies 41, 42 provide power to the braking systems 8, 2, and the additional power supplies 16, 17 provide power to the steering system 15.

Similar to the energy storage units 41, 42 for the brake system, this embodiment may include an additional monitoring for the following functions: the stored energy level and/or state of function (estimated in a predictive way) of dedicated energy storage units 16, 17 of the additional power circuits. Furthermore, this embodiment may implement a charge management (e.g. for the charge state) to keep the energy level of these energy storage units 16, 17 at a target level to reserve as much energy as needed to perform defined manoeuvres to reach safe state. This controlling and management can be performed by a respective control unit (not shown in FIG. 4).

Figure 5:
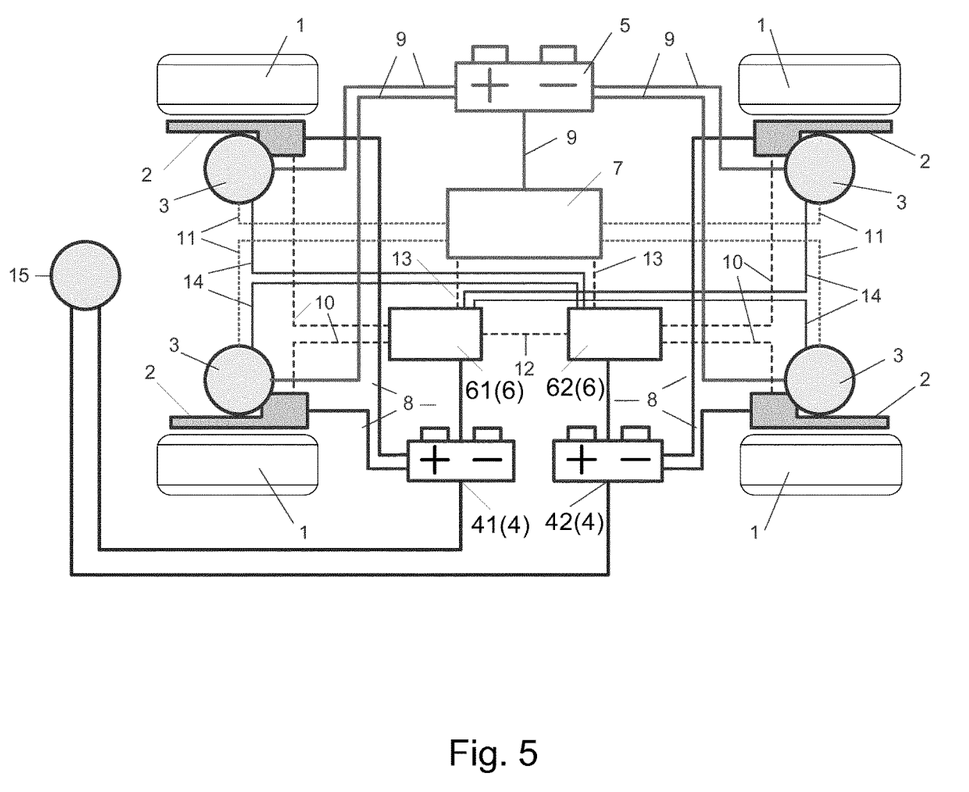
FIG. 5 depicts a further embodiment for the system of controlling the electric vehicle.

FIG. 5 depicts another embodiment of the present invention, wherein the steering system receives redundant power from the brake power supplies 41, 42. Therefore, the power supply lines 8 (circuits) of brake system and the brake energy storage units 41, 42 are shared with the steering system. The sizing of the batteries shall consider the consumption of both of the steering and brake system. Similarly, the stored energy levels, the state of function (estimated in a predictive way) of dedicated energy storage units 41, 42 of additional power circuits are again monitored and/or managed (e.g. charged) by a respective control unit. As a result, the energy level of these energy storage units 41, 42 can be kept at a target level to reserve the required energy to perform defined manoeuvres to reach safe state.

All other components or functions of the embodiments of FIGS. 4 and 5 are the same as described in the embodiment of FIG. 1 so that a repeated description can be avoided here.

Further advantageous embodiments relate to the following subject matters:

A redundant architecture for electric vehicles with a propulsion power supply circuit 9, energy storage units 5 and at least one additional independent energy storage 4 for safety relevant consumer(s) and control units for the propulsion and vehicle dynamic systems respectively 7, 6, wherein the propulsion actuators 3 are contributing as one brake circuit of the vehicle in case of failure.

The defined redundant architecture for electric vehicles, wherein the propulsion system recuperates the brake energy to a battery 7.

The defined redundant architecture for electric vehicles, wherein the propulsion system dissipates the brake energy by brake resistor to the environment.

The defined redundant architecture for electric vehicles, wherein the propulsion system is commanded by the vehicle dynamic control unit(s) 6.

The defined redundant architecture for electric vehicles, wherein the propulsion system comprising the propulsion actuators 3 individual to each wheel.

The defined redundant architecture for electric vehicles, wherein the propulsion system drives an axle, or axle groups.

The defined redundant architecture for electric vehicles with an interlink communication line 12 between redundant vehicle dynamic controllers 6.

The defined redundant architecture for electric vehicles, wherein the vehicle dynamic controller units are supplied from independent power supply circuits.

The defined redundant architecture for electric vehicles, wherein each the additional power circuit 8 and the corresponding energy storage units 4 are distributed axle wise.

The defined redundant architecture for electric vehicles, wherein the drive actuator 3 supports vehicle dynamic functions, ABS, ATC in such a way that the high frequency modulation is realized by the propulsion actuator and the low frequency part by the brake actuator.

The defined redundant architecture for electric vehicles, wherein drive actuator motor speed signal is used as back-up wheel speed signal for the brake and vehicle dynamic functions in case the wheel speed sensor of brake system is not available.

A redundant architecture for electric vehicles with a propulsion power supply circuit 9, energy storage units 5 and at least one additional independent energy storage 4 for safety relevant consumer(s) and control units for the propulsion and vehicle dynamic systems respectively 7, 6, wherein the propulsion actuators are contributing as one steering circuit of the vehicle in case of failure.

The defined redundant architecture for electric vehicles, wherein the propulsion system is commanded by vehicle dynamic control unit(s) 6.

The defined redundant architecture for electric vehicles, wherein the propulsion system comprises the propulsion actuators 3 individual to each wheel on the steering axle.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

LIST OF REFERENCE SIGNS

1 wheel(s)
2 brake actuator(s)
3 propulsion/drive actuator(s)unit
4, 41, 42 brake power supply (energy storage for brake system)
5 main power supply (energy storage for propulsion system)
6, 61, 62 brake control unit(s)
7 propulsion control unit
8 energy supply line for brake system
9 energy supply line for propulsion system
10 communication/control line for brake system
11 communication/control line for propulsion system
12 interlink, communication/control line between brake control units
13 communication/control line between brake and propulsion control units
14 communication/control line between brake and propulsion actuator units
15 steering system (actuator and controller)
16, 17 energy storage unit(s) dedicated for steering system

The invention claimed is:

1. A system for controlling an electric vehicle, the electric vehicle comprising a main power supply for propulsion of the vehicle and a brake power supply for a brake actuator, the system comprising:
   a propulsion control unit for controlling a propulsion actuator;
   a brake control unit for controlling the brake actuator, and
   a control line between the propulsion control unit and the brake control unit for exchanging commands or information about a failure of one component and/or providing a backup control, wherein
      the propulsion control unit is further configured to:
         control one or more propulsion actuators to perform a backup braking or a backup steering of the electric vehicle, and
         if the brake control unit has a failure, take over the control by accessing the brake actuator via the brake control unit.

2. The system according to claim 1, wherein
the propulsion control unit is configured to cause to dissipate or to recuperate brake energy released during the backup braking.

3. The system according to claim 1, further comprising:
a communication line between the propulsion actuator and the brake control unit, wherein
the brake control unit is further configured to control propulsion of the vehicle via the communication line.

4. The system according to claim 1, wherein
one or both of the propulsion control unit or the brake control unit are configured to control propulsion actuators individually on each wheel or axle-wise.

5. The system according to claim 1, wherein
the brake power supply comprises a first brake power supply and a second brake power supply that are independent from each other, and
the brake control unit comprises a first brake control unit and a second brake control unit, which are connected with each other via an interlink to exchange commands or information between the first brake control unit and the second brake control unit and/or to provide a backup control.

6. The system according to claim 5, wherein
the first brake control unit is configured to be powered by the first brake power supply and the second brake power supply is configured to power the second brake control unit.

7. The system according to claim 5, wherein
the first brake power supply and the first brake control unit are associated with a first axle, and the second brake power supply together with the second brake control unit are associated with a different axle of the vehicle.

8. The system according to claim 1, wherein
the propulsion actuator is configured to support at least one of the following vehicle dynamic functions:
anti-blocking system,
automated traction control,
drag torque control,
electronic stability program, or
request torque and/or a torque limitation or a torque vectoring,
wherein the propulsion control unit is configured to enable at least one of the vehicle dynamic functions by providing a high-frequency modulation via the propulsion actuator and/or a low-frequency modulation via the brake actuator.

9. The system according to claim 8, wherein the propulsion control unit or the brake control unit is configured to:
receive a drive actuator motor speed signal, and
in case a wheel speed sensor of the system is unavailable, use the drive actuator motor speed signal as a backup wheel speed signal for a braking actuation and/or for a vehicle dynamic function.

10. A propulsion system for the electric vehicle, comprising:
the system of claim 1; and
one or more of the propulsion actuator(s) disposed at one or more wheels of the electric vehicle.

11. A brake system for the electric vehicle, comprising:
the system of claim 1; and
the brake power supply for safety relevant consumers.

12. An electric commercial vehicle, comprising:
a main power supply for propulsion of the vehicle;
a brake power supply for a brake actuator;
an individual propulsion actuator at each vehicle wheel;
a brake control unit for controlling the brake actuator; and
a propulsion control unit configured to:
control propulsion of the vehicle,
control one or more of the individual propulsion actuators to perform a backup braking or a backup steering of the vehicle, and
if the brake control unit has a failure, take over the control by accessing the brake actuator via the brake control unit.

13. A method for controlling an electric vehicle, the electric vehicle comprising a main power supply for propulsion of the vehicle and a brake power supply for a brake actuator, comprising:
controlling a propulsion actuator by a propulsion control unit;
controlling the brake actuator by a brake control unit;
upon detecting a failure in brake control by the brake control unit, controlling one or more propulsion actuators to perform a backup braking or a backup steering; and
upon detecting that the brake control unit has a failure, taking over the control by accessing the brake actuator via the brake control unit.

14. A non-transitory computer-readable medium comprising instructions operable, when executed by one or more computing systems, to cause the one or more computing systems to:
control a propulsion actuator by a propulsion control unit;
control a brake actuator by a brake control unit; and
upon detecting a failure in brake control by the brake control unit, control one or more propulsion actuators to perform a backup braking or a backup steering by accessing the brake actuator via the brake control unit.

* * * * *